(12) United States Patent
Aishima et al.

(10) Patent No.: US 11,072,249 B2
(45) Date of Patent: Jul. 27, 2021

(54) FUEL CELL VEHICLE

(71) Applicant: TOYOTA JIDOSHA KABUSHIKI KAISHA, Toyota (JP)

(72) Inventors: Tetsuji Aishima, Toyota (JP); Yoshihiro Kubota, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 154 days.

(21) Appl. No.: 16/666,768

(22) Filed: Oct. 29, 2019

(65) Prior Publication Data

US 2020/0180444 A1 Jun. 11, 2020

(30) Foreign Application Priority Data

Dec. 6, 2018 (JP) .............................. JP2018-229422

(51) Int. Cl.
*B60L 50/72* (2019.01)
*B60L 50/71* (2019.01)
*H01M 8/04089* (2016.01)

(52) U.S. Cl.
CPC ............... *B60L 50/72* (2019.02); *B60L 50/71* (2019.02); *H01M 8/04097* (2013.01); *H01M 2250/20* (2013.01)

(58) Field of Classification Search
CPC .................................. B60L 50/71; B60L 50/72
See application file for complete search history.

(56) References Cited

U.S. PATENT DOCUMENTS

| | | | |
|---|---|---|---|
| 2008/0230288 A1* | 9/2008 | Shiomi | H01M 8/04014 180/65.31 |
| 2010/0112404 A1* | 5/2010 | Yamagishi | H01M 8/04097 429/469 |
| 2015/0027796 A1* | 1/2015 | Naito | B60K 1/04 180/65.31 |
| 2016/0207386 A1* | 7/2016 | Nagaosa | B60L 50/71 |
| 2016/0368358 A1* | 12/2016 | Nagaosa | B60L 58/30 |
| 2017/0101031 A1 | 4/2017 | Ohashi | |
| 2017/0133691 A1* | 5/2017 | Yamafuji | H01M 8/02 |
| 2017/0267301 A1* | 9/2017 | Katano | H01M 8/04952 |
| 2018/0178641 A1* | 6/2018 | Yamafuji | H01M 8/2465 |
| 2018/0297461 A1* | 10/2018 | Tambo | H01M 50/20 |
| 2018/0304767 A1* | 10/2018 | Ichida | H01M 8/2465 |
| 2019/0198907 A1* | 6/2019 | Uchiyama | H01M 8/247 |
| 2019/0260060 A1* | 8/2019 | Kamiyama | H01M 8/2475 |

(Continued)

FOREIGN PATENT DOCUMENTS

| | | |
|---|---|---|
| JP | 2017-074819 A | 4/2017 |
| JP | 2019-142357 A | 8/2019 |

*Primary Examiner* — Erez Gurari
(74) *Attorney, Agent, or Firm* — Dickinson Wright, PLLC (57) ABSTRACT

A fuel gas pump of a fuel cell vehicle is fixed to a stack frame and a fuel cell stack via a first bracket and a second bracket so that a rotation axis of a motor is inclined to a reference line along a front-rear direction. The first bracket is fixed by passing a second fastening member through a first notch. The second bracket is fixed by passing a third fastening member through a second notch of a second arm. The first and second brackets are provided such that, when the fuel gas pump rotates, the third fastening member comes off from the second bracket at a timing different from a timing when the second fastening member comes off from the first bracket.

9 Claims, 9 Drawing Sheets

(56) References Cited

U.S. PATENT DOCUMENTS

| | | | |
|---|---|---|---|
| 2019/0375282 A1* | 12/2019 | Lee | B60K 1/04 |
| 2020/0067108 A1* | 2/2020 | Yoshitomi | H01M 8/249 |
| 2020/0130517 A1* | 4/2020 | Akiyama | B60L 50/71 |
| 2020/0180444 A1* | 6/2020 | Aishima | H01M 8/04097 |
| 2020/0303759 A1* | 9/2020 | Naito | H01M 8/248 |

* cited by examiner

FUEL CELL VEHICLE

INCORPORATION BY REFERENCE

The disclosure of Japanese Patent Application No. 2018-229422 filed on Dec. 6, 2018 including the specification, drawings and abstract is incorporated herein by reference in its entirety.

BACKGROUND

1. Technical Field

The disclosure relates to a fuel cell vehicle.

2. Description of Related Art

A fuel cell stack and its peripheral devices (accessories) are provided in a front room of a fuel cell vehicle on the front side in the vehicle front-rear direction. The fuel cell stack is put on a stack frame fixed to the front room, and the accessories such as a compressor and a fuel gas pump are attached to a lower part of the stack frame (e.g., see Japanese Unexamined Patent Application Publication No. 2017-74819 (JP 2017-74819 A)).

SUMMARY

Here, the fuel gas pump attached to the lower part of the stack frame recovers fuel offgas from the fuel cell stack and supplies part of the fuel offgas thus recovered to the fuel cell stack again as fuel gas. The fuel cell stack is put on the stack frame, and therefore, in order that the fuel gas pump circulates the fuel offgas to the fuel cell stack with a shorter route, it is assumed that the fuel gas pump is attached to the stack frame so as to project toward a dash panel side from the stack frame, for example.

However, in such an attachment state, when the fuel cell vehicle has a front end collision, the stack frame moves toward the dash panel side together with the fuel cell stack and the accessories attached to the stack frame. At this time, the fuel gas pump projecting from the stack frame might be pushed into the dash panel.

The disclosure provides a fuel cell vehicle that can restrain the fuel gas pump which projects from the stack frame pushing into the dash panel when a load is applied to a vehicle from the front side in the vehicle front-rear direction.

A fuel cell vehicle according to an aspect of the disclosure is a fuel cell vehicle includes: a fuel cell stack; a fuel gas pump configured to circulate, to the fuel cell stack, part of fuel offgas discharged from the fuel cell stack; a front room in which the fuel cell stack and the fuel gas pump are stored, the front room being provided on a front side of the fuel cell vehicle in a vehicle front-rear direction; and a dash panel separating the front room from a cabin, wherein: the fuel cell stack is put on a stack frame fixed to the front room; the fuel gas pump is attached to a lower side of the stack frame in a state where the fuel gas pump projects toward a dash panel side from the stack frame; the fuel gas pump is fixed to the stack frame and the fuel cell stack via a first bracket and a second bracket such that a rotation axis of a motor configured to drive the fuel gas pump is inclined to a reference line along the vehicle front-rear direction in a plan view of the fuel cell vehicle; the first bracket includes a flat-shaped attachment portion which has a through-hole and a first notch; the attachment portion is attached to the stack frame by a first fastening member and a second fastening member; the first fastening member fixes the stack frame to the first bracket in a state where the first fastening member is passed through the through-hole; the second fastening member fixes the stack frame to the first bracket in a state where the second fastening member is passed through the first notch; the second bracket includes a first arm extending in a first direction and a second arm connected to the first arm via a bending portion and extending in a second direction, the second direction being a direction different from the first direction; the first arm has a second notch; the first arm is attached to the fuel gas pump by a third fastening member passed through the second notch; the second arm is fixed to the fuel cell stack; the first notch is provided such that the second fastening member comes off from the first bracket and slips out of the first notch when the fuel gas pump rotate, relative to the stack frame, around the first fastening member as a rotation center; the second notch is provided such that the third fastening member comes off from the second bracket and slips out of the second notch; and the first bracket and the second bracket are configured such that the third fastening member comes off from the second bracket and slips out of the second notch by rotating the fuel gas pump at a timing different from a timing when the second fastening member comes off from the first bracket.

According to the above aspect, when a load is applied from the front side in the vehicle front-rear direction, the stack frame attached to the front room moves toward the dash panel side. At this time, the fuel gas pump is attached to a lower part of the stack frame in a state where the fuel gas pump projects toward the dash panel side from the stack frame. Accordingly, the fuel gas pump moves toward the dash panel side together with the stack frame, so that the fuel gas pump makes contact with the dash panel.

Here, the fuel gas pump is fixed to the stack frame and the fuel cell stack via the first and the second brackets so that the rotation axis of the motor that drives the fuel gas pump is inclined to the reference line along the front-rear direction of the fuel cell vehicle, in a plan view of the fuel cell vehicle. Hereby, when the fuel gas pump makes contact with the dash panel, a moment is applied to the fuel gas pump, so that the fuel gas pump is to rotate in a direction where the fuel gas pump is distanced from the dash panel.

At this time, the first bracket rotates together with the fuel gas pump relative to the stack frame around the first fastening member passed through the through-hole as the rotation center, and the second fastening member comes off from the first bracket and slips out of the first notch. As such, the fuel gas pump rotates with the first bracket without difficulty, thereby making it possible to restrain that the fuel gas pump pushes the dash panel toward the cabin side.

Further, due to the rotation of the fuel gas pump relative to the stack frame, the third fastening member comes off from the second bracket and slips out of the second notch at the timing different from the timing when the second fastening member comes off from the first bracket. As such, since the timing when the second fastening member comes off from the first bracket is different from the timing when the third fastening member comes off from the second bracket, it is possible to restrain the load to be applied to the dash panel at two stages at the time of a collision. As a result, it is possible to restrain deformation of the dash panel and to easily secure safety of an occupant. That a fastening member comes off from a bracket as used herein indicates that a fixation state of the bracket by the fastening member is released.

Here, materials, shapes, and the like of the first bracket and the second bracket are not particularly limited provided that the second fastening member and the third fastening member come off from the first and second brackets at different timings. For example, when a contact length by which the second fastening member makes contact with the first bracket and a contact length by which the third fastening member makes contact with the second bracket are adjusted in a range where the fuel gas pump rotates, the timing when the second fastening member comes off from the first bracket and the timing when the third fastening member comes off from the second bracket can be adjusted.

In the above aspect, the second bracket may be a plastically deformable metal member, and the second bracket may be configured such that, when the fuel gas pump rotates relative to the stack frame, the third fastening member comes off from the second bracket after at least the bending portion of the second bracket deforms plastically.

According to the above configuration, when the fuel gas pump rotates relative to the stack frame in the first bracket, at least the bending portion of the second bracket deforms plastically, so that an impact load caused at the time of a collision of the vehicle can be absorbed by the second bracket. Further, the second fastening member can come off from the first bracket while the second bracket deforms plastically, and after that, the third fastening member can come off from the second bracket. Hereby, while the impact load to be applied to the dash panel at the time when the fuel gas pump rotates is absorbed by the plastic deformation of the second bracket, the impact load can be restrained at two stages.

In the above aspect, the shape of the second bracket is not limited particularly provided that the second bracket deforms plastically. The second bracket may have a shape narrowed at the bending portion.

According to the above configuration, the bending portion of the second bracket is a more vulnerable part than other parts, so that the second bracket can easily deform plastically at the bending portion. Hereby, while the impact load is absorbed by the bending portion, it is possible to restrain disturbance to the rotation of the fuel gas pump.

In the above aspect, a length from the rotation center to an attachment position of the second fastening member may be the same as a length from the rotation center to an attachment position of the third fastening member, or they may be different from each other, provided that the second fastening member and the third fastening member come off from the first and second brackets at different timings. A distance from the rotation center to the attachment position of the third fastening member may be longer than a distance from the rotation center to the attachment position of the second fastening member.

According to the above configuration, when the fuel gas pump rotates relative to the stack frame, a larger moment is applied to the third fastening member than a moment applied to the second fastening member, so that the second bracket easily deforms plastically. Hereby, while the impact load is absorbed by the bending portion, it is possible to restrain disturbance to the rotation of the fuel gas pump.

In the above aspect, the second arm may extend along a side face of the fuel cell stack in a vehicle width direction; and the bending portion may be connected to a bottom end of the second arm.

In the above aspect, the first notch may be provided on a rear side of the attachment portion in the vehicle front-rear direction; and the second notch may be provided on a front side of the first arm in the vehicle front-rear direction.

In the above aspect, an attachment position of the third fastening member may be behind a straight line connecting the rotation center and an attachment position of the second fastening member in the vehicle front-rear direction.

In the above aspect, the first direction may be a horizontal direction; and the second direction may be a vertical direction.

A fuel cell vehicle according to a second aspect of the present disclosure includes: a fuel cell stack; a fuel gas pump configured to circulate, to the fuel cell stack, part of fuel offgas discharged from the fuel cell stack; a front room in which the fuel cell stack and the fuel gas pump are stored, the front room being provided on a front side of the fuel cell vehicle in a vehicle front-rear direction; and a dash panel separating the front room from a cabin, wherein: the fuel cell stack is put on a stack frame fixed to the front room; the fuel gas pump is attached to the stack frame in a state where the fuel gas pump projects toward a dash panel side from the stack frame; the fuel gas pump is fixed to the stack frame and the fuel cell stack via a first bracket and a second bracket such that a line align a longitudinal direction of the fuel gas pump is inclined to a reference line along the vehicle front-rear direction in a plan view of the fuel cell vehicle; the first bracket includes a flat-shaped attachment portion which has a through-hole and a first notch; the attachment portion is attached to the stack frame by a first fastening member and a second fastening member; the first fastening member fixes the stack frame to the first bracket in a state where the first fastening member is passed through the through-hole; the second fastening member fixes the stack frame to the first bracket in a state where the second fastening member is passed through the first notch; the second bracket includes a first arm extending in a first direction and a second arm connected to the first arm via a bending portion and extending in a second direction, the second direction being a direction different from the first direction; the first arm has a second notch; the first arm is attached to the fuel gas pump by a third fastening member passed through the second notch; the second arm is fixed to the fuel cell stack; and the first bracket and the second bracket are provided such that the second fastening member and the third fastening member come off from the first bracket and the second bracket respectively at different timings in a case where the fuel gas pump rotates around the first fastening member as a rotation center.

According to the fuel cell vehicle of the disclosure, it is possible to restrain that a fuel gas pump pushes a dash panel toward cabin side.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
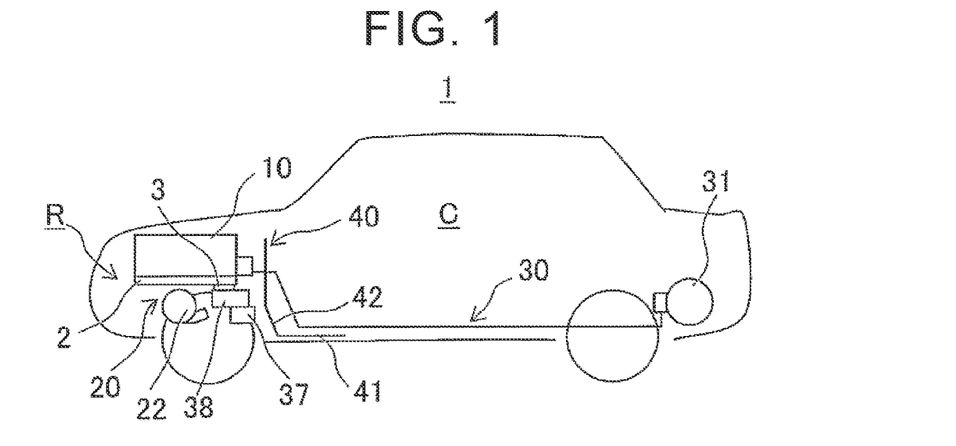
FIG. 1 is a conception diagram of one embodiment of a fuel cell vehicle according to the disclosure.

One embodiment of a fuel cell vehicle according to the disclosure will be hereinafter described in detail with reference to the drawings. First described is the fuel cell vehicle according to the disclosure with reference to FIG. 1. In FIG. 1, the fuel cell vehicle 1 is a vehicle such as a passenger car and has a front room R that is formed on the front side in the vehicle front-rear direction. In the front room R, a fuel cell stack 10 and some accessories, e.g., a compressor 22, a gas-liquid separator 37, and a fuel gas pump 38 such as a hydrogen pump, are stored. The compressor 22 constitutes a part of an oxidant gas supply system 20 configured to supply oxidant gas to the fuel cell stack 10. The gas-liquid separator 37 and the fuel gas pump 38 constitute a circulation passage 36 through which fuel offgas discharged from the fuel cell stack 10 circulates to the fuel cell stack 10 (see FIG. 2).

The fuel cell vehicle 1 includes a dash panel 40 between the front room R and a cabin C in which an occupant is to be seated, on the front side in the vehicle front-rear direction, so that the dash panel 40 separates the front room R from the cabin C. The dash panel 40 is a panel made of metal such as steel or aluminum alloy and has a rigidity higher than that of the gas-liquid separator 37. The dash panel 40 includes a floorboard 41 constituting a floor face of the cabin C and a toe board 42 extending from the floorboard 41 so as to be inclined upward. The dash panel 40 includes a reinforcement (not shown) to secure a space of the cabin C. The reinforcement has a rigidity higher than that of the fuel gas pump 38.

Figure 3:
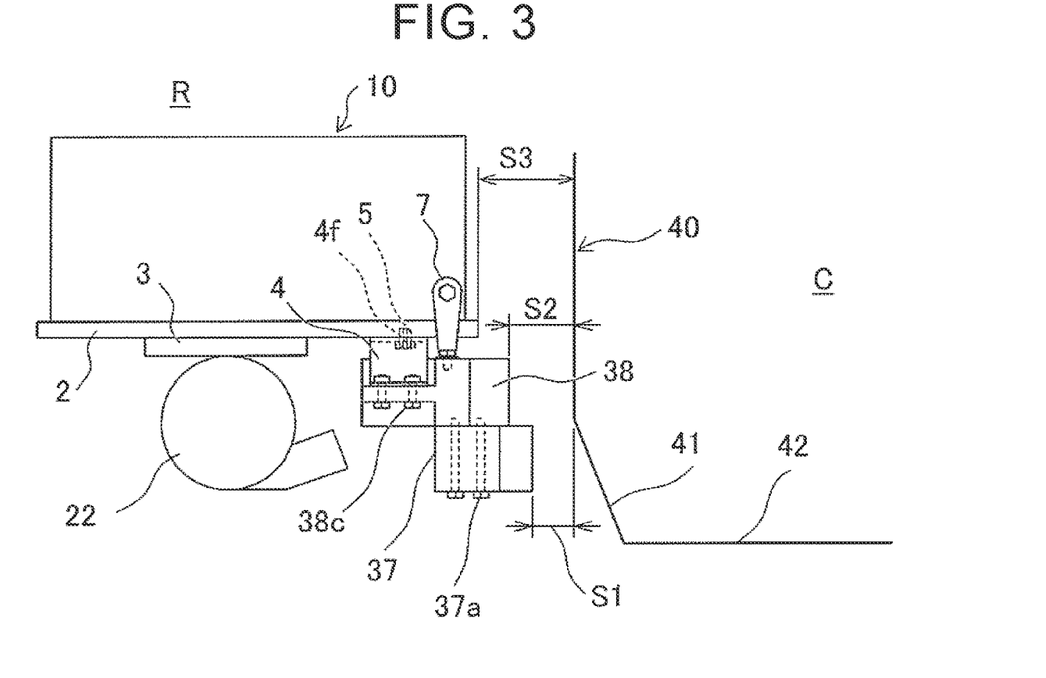
FIG. 3 is a main schematic view illustrating a side face of a main part in one embodiment of the fuel cell vehicle illustrated in FIG. 1.

As illustrated in FIG. 3, the fuel cell stack 10 is put on an upper part of a stack frame 2, and the stack frame 2 is fixed to a member forming the front room R. The compressor 22 is fixedly attached to a lower part of the stack frame 2 in a suspended state via a compressor bracket 3. The fuel gas pump 38 is attached to the lower part of the stack frame 2 and the fuel cell stack 10 in a state where the fuel gas pump 38 projects from the stack frame 2 toward the dash panel 40 side and in a state where the fuel gas pump 38 is suspended via a first bracket 4 and a second bracket 7.

Further, the gas-liquid separator 37 is attached to a lower part of the fuel gas pump 38 in a state where the gas-liquid separator 37 projects toward the dash panel 40 side from the stack frame 2 and the fuel gas pump 38. The fuel gas pump 38 is a metal device made of a metallic material such as iron-based material or an aluminum-based material, and the gas-liquid separator 37 is a device made of resin such as polyphenylene sulfide (PPS) or polyamide (PA) for example. A fuel gas source 31 constituting the fuel gas supply system 30 configured to supply hydrogen gas to the fuel cell stack 10 is provided in a rear part of the fuel cell vehicle 1.

Figure 2:
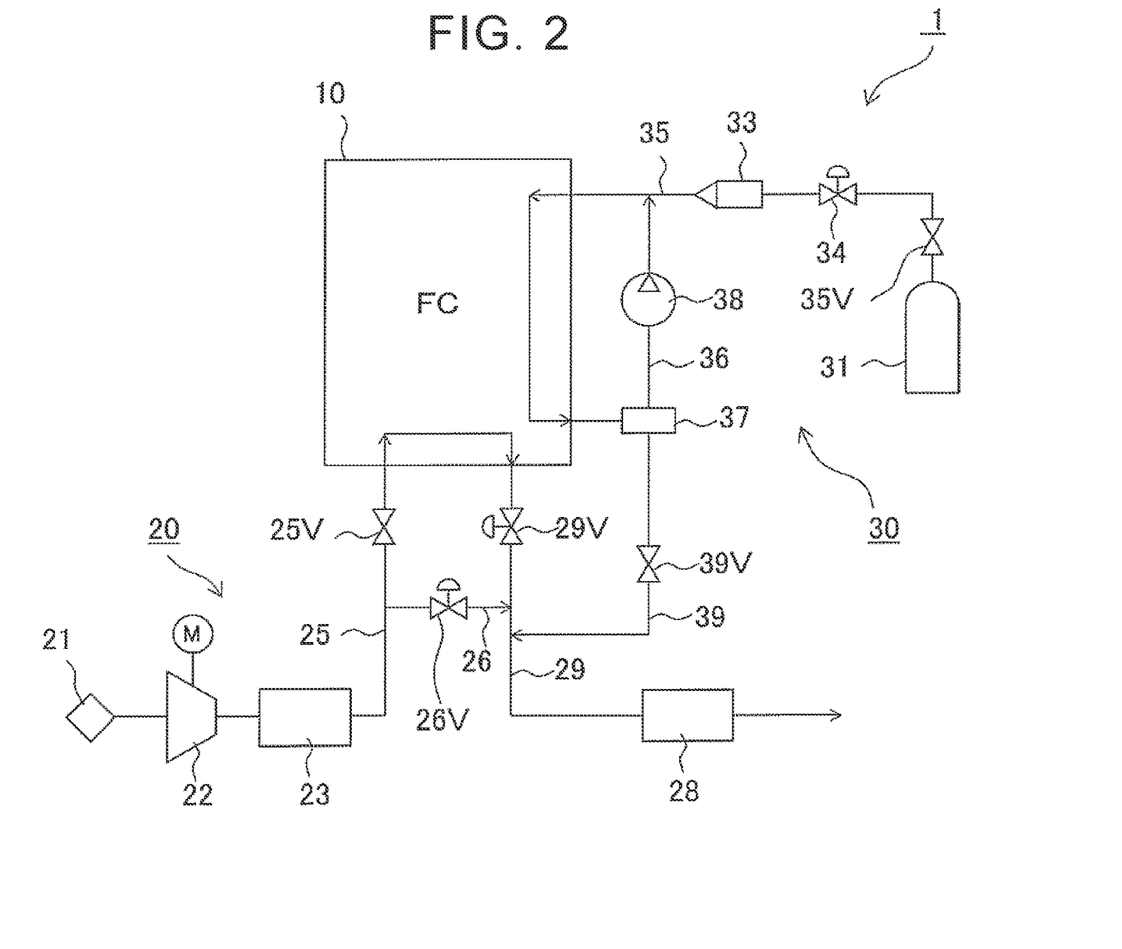
FIG. 2 is a system configuration diagram of a fuel cell system used in the fuel cell vehicle illustrated in FIG. 1.

Next will be described a system configuration of a fuel cell system used in the fuel cell vehicle 1 of the present embodiment with reference to FIG. 2. The fuel cell system illustrated in FIG. 2 includes, for example, the fuel cell stack 10 configured such that a plurality of fuel cells each as a unit cell is laminated, the oxidant gas supply system 20 configured to supply oxidant gas such as air to the fuel cell stack 10, and the fuel gas supply system 30 configured to supply fuel gas such as hydrogen to the fuel cell stack 10.

The oxidant gas supply system 20 includes, for example, an oxidant gas supply passage 25 configured to supply the oxidant gas to the fuel cell stack 10, and an oxidant gas discharge passage 29 configured to discharge, from the fuel cell stack 10, oxidant offgas supplied to the fuel cell stack 10 and subjected to an electrochemical reaction in the fuel cells. Further, the oxidant gas supply system 20 includes a bypass passage 26 configured to circulate the oxidant gas supplied via the oxidant gas supply passage 25 to the oxidant gas discharge passage 29 without causing the oxidant gas to pass through the fuel cell stack 10. The passages of the oxidant gas supply system 20 can be constituted by a pipe such as a rubber hose or a metal pipe, for example.

From the upstream side, the oxidant gas supply passage 25 is provided with an air cleaner 21, the compressor 22, an intercooler 23, and so on, and the oxidant gas discharge passage 29 is provided with an exhaust muffler 28 and so on. The oxidant gas supply passage 25 is provided with an inlet valve 25V configured to shut off the flow of the oxidant gas between the intercooler 23 and the fuel cell stack 10. The oxidant gas discharge passage 29 is provided with a pressure control valve 29V configured to adjust a back pressure of the oxidant gas to be supplied to the fuel cell stack 10. Note that the oxidant gas supply passage 25 is provided with an atmospheric pressure sensor, an air flow meter, and the like (not shown), for example.

A first end of the bypass passage 26 is connected to the oxidant gas supply passage 25, and a second end of the bypass passage 26 is connected to the oxidant gas discharge passage 29. The oxidant gas pumped by the compressor 22 and cooled off by the intercooler 23 is discharged to flow through the bypass passage 26 toward the oxidant gas discharge passage 29 by bypassing the fuel cell stack 10. The bypass passage 26 is provided with a bypass valve 26V configured to adjust a flow rate of the oxidant gas flowing through the bypass passage 26 by shutting off the oxidant gas flowing toward the oxidant gas discharge passage 29.

In the meantime, the fuel gas supply system 30 includes, for example, the fuel gas source 31 such as a hydrogen tank in which high-pressure fuel gas such as hydrogen is stored, a fuel gas supply passage 35 through which the fuel gas is supplied from the fuel gas source 31 to the fuel cell stack 10, the circulation passage 36 through which the fuel offgas (unburned fuel gas) discharged from the fuel cell stack 10 is partially returned to the fuel gas supply passage 35, and a fuel gas discharge passage 39 connected to the circulation passage 36 in a branched manner so that the fuel offgas inside the circulation passage 36 is discharged to outside (released into the atmosphere). Each of the passages of the fuel gas supply system 30 can be constituted by a pipe such as a rubber hose or a metal pipe, for example.

The fuel gas supply passage 35 is provided with a shut-off valve 35V configured to shut off the fuel gas flowing toward the fuel cell stack 10 by opening and closing the fuel gas supply passage 35, a regulator 34 configured to adjust (decompress) a pressure of the fuel gas flowing through the fuel gas supply passage 35, and an injector 33 configured to supply the fuel gas thus subjected to pressure adjustment toward the fuel cell stack 10.

The circulation passage 36 is provided with the gas-liquid separator 37, the fuel gas pump 38, and so on from the upstream side (the fuel cell stack 10 side). The gas-liquid separator 37 separates, from gas, generated water included in the fuel gas (hydrogen, and the like) flowing through the circulation passage 36 and accumulates it therein. The fuel gas discharge passage 39 is provided by branching off from the gas-liquid separator 37. The fuel gas pump 38 pumps a part of the fuel offgas from which a liquid content is separated by gas-liquid separation in the gas-liquid separator 37, so as to circulate the part of the fuel offgas to the fuel gas supply passage 35.

The fuel gas discharge passage 39 is provided with a purge valve 39V configured to discharge the generated water separated in the gas-liquid separator 37 and a part of the fuel offgas discharged from the fuel cell stack 10 by opening and closing the fuel gas discharge passage 39. The fuel offgas discharged by adjusting the purge valve 39V of the fuel gas discharge passage 39 to be opened and closed is mixed with oxidant offgas flowing through the oxidant gas discharge passage 29 and then released outside into the atmosphere via the exhaust muffler 28.

The fuel cell system having such a configuration generates power by an electrochemical reaction between the oxidant gas such as the air supplied to the fuel cell (a cathode electrode thereof) by the oxidant gas supply system 20 and the fuel gas such as hydrogen supplied to the fuel cell (an anode electrode thereof) by the fuel gas supply system 30.

Next will be described a characteristic configuration of the fuel cell vehicle 1 of the present embodiment with reference to FIGS. 3 to 6B. The fuel cell vehicle 1 of the present embodiment includes, in the front room R, the compressor 22 configured to compress and discharge the oxidant gas to be supplied to the fuel cell stack 10, the gas-liquid separator 37 configured to separate liquid and gas from each other in the fuel offgas discharged from the fuel cell stack 10, and the fuel gas pump 38 such as a hydrogen pump configured to circulate a part of the fuel offgas from which a liquid content is separated by the gas-liquid separator 37 to the fuel cell stack 10.

More specifically, the fuel cell stack 10 is put on an upper part of the stack frame 2, and the compressor 22 is attached to the lower part of the stack frame 2 via the compressor bracket 3, in front of the fuel gas pump 38 in the vehicle front-rear direction.

The fuel gas pump 38 includes a motor M configured to suck in the fuel gas and discharge the fuel gas thus sucked in to outside. Behind the compressor 22 in the vehicle front-rear direction, the fuel gas pump 38 is attached to the lower part of the stack frame 2 and the fuel cell stack 10 (more specifically, a stack case) via the first bracket 4 and the second bracket 7, in a state where the fuel gas pump 38 projects from the stack frame 2 toward the dash panel 40 side.

The gas-liquid separator 37 is attached to the lower part of the fuel gas pump 38 by passing a fastening member 37a such as a bolt and a nut through a penetration hole 37b, in a state where the gas-liquid separator 37 projects toward the dash panel 40 side from the stack frame 2 and the fuel gas pump 38.

In such an attachment state, a rear end surface of the fuel gas pump 38 in the vehicle front-rear direction projects rearward from a rear end surface of the fuel cell stack 10 in the vehicle front-rear direction, and a rear end surface of the gas-liquid separator 37 in the vehicle front-rear direction projects rearward from the rear end surface of the fuel gas pump 38 in the vehicle front-rear direction.

More specifically, respective distances S1 to S3, in the front-rear direction of the fuel cell vehicle 1, from the gas-liquid separator 37, the fuel gas pump 38, and the stack frame 2 to the dash panel 40 satisfy the following relationship. Among these distances S1 to S3, the distance S1 between the dash panel 40 and the gas-liquid separator 37 is smallest, the distance S2 between the dash panel 40 and the fuel gas pump 38 is larger than the distance S1, and the distance S3 between the dash panel 40 and the stack frame 2 is further larger than the distance S2.

The gas-liquid separator 37 closest to the dash panel 40 is substantially made of resin and has a rigidity lower than that of the fuel gas pump 38. Further, the fuel gas pump 38 is substantially made of metal and has a rigidity higher than that of the gas-liquid separator 37.

Figure 4:
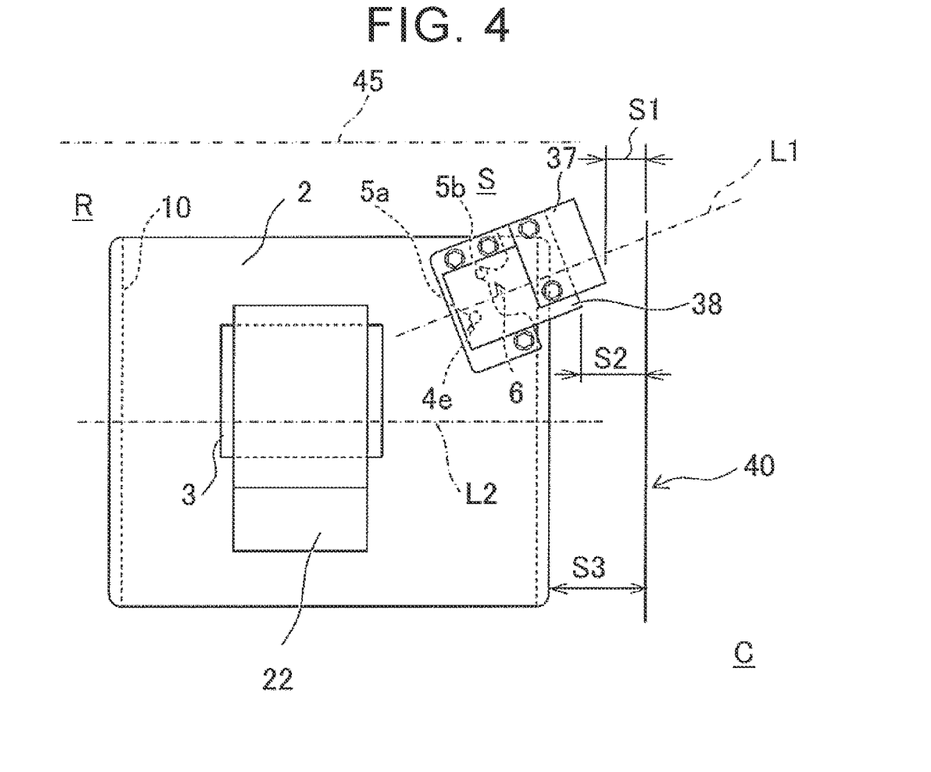
FIG. 4 is a main schematic view illustrating a bottom face of the main part in FIG. 3.
Figure 5:
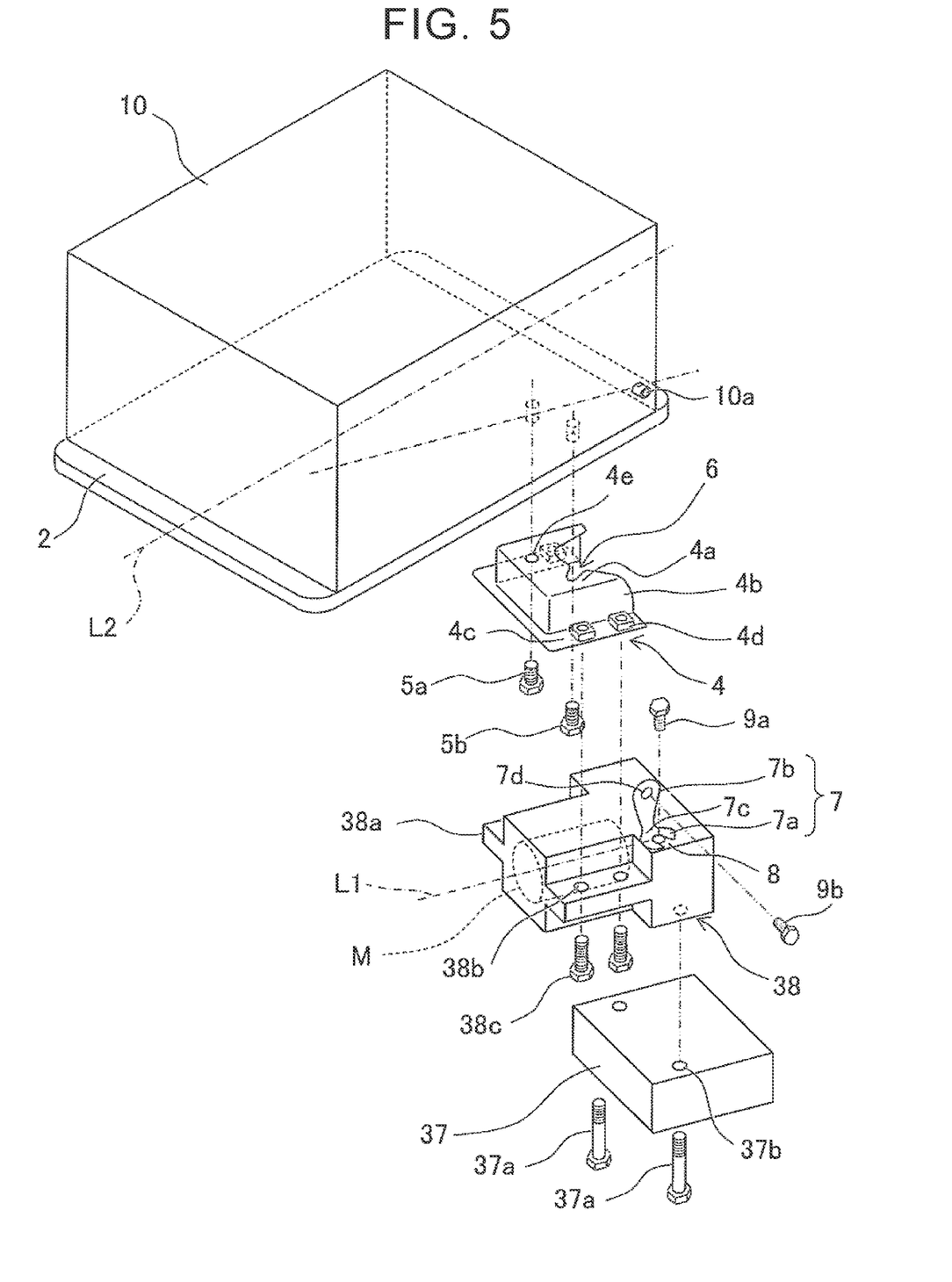
FIG. 5 is an exploded perspective view illustrating the main part illustrated in FIGS. 3 and 4.

Further, in the fuel cell vehicle 1, as illustrated in FIGS. 4 and 5, the fuel gas pump 38 is fixed to the stack frame 2 via the first bracket 4 so that a rotation axis L1 of the motor M that drives the fuel gas pump 38 is inclined to a reference line L2 along the front-rear direction of the fuel cell vehicle 1, in a plan view of the fuel cell vehicle 1. An inclination angle of the rotation axis L1 to the reference line L2 is preferably not less than 20° but not more than 40°, for example.

On this account, the fuel gas pump 38 is fixed diagonally to a travel direction of the fuel cell vehicle 1, and a rear corner part of the fuel gas pump 38 faces a front face of the dash panel 40, so that this corner part is closer to the dash panel 40. Further, a rear corner part of the gas-liquid separator 37 also faces the front face of the dash panel 40, so that this corner part is further closer to the dash panel 40. As described above, since the fuel gas pump 38 is inclined and fixed to the stack frame 2, when the rear corner part of the fuel gas pump 38 in the vehicle front-rear direction abuts with the dash panel 40, the fuel gas pump 38 can rotate so as to be separated from the dash panel 40.

In the present embodiment, as illustrated in FIG. 4, the fuel gas pump 38 is attached to the stack frame 2 on a side closer to a front fender and the rotation axis L1 of the motor M is inclined so as to approach the center line along the front-rear direction of the fuel cell vehicle 1 as it goes forward in the vehicle front-rear direction. Note that, in FIG. 4, the center line is drawn to agree with the reference line L2. With such an arrangement, when a collision occurs, the fuel gas pump 38 rotates in a space S in the front room R in a plan view of the fuel cell vehicle 1, thereby making it possible for the fuel gas pump 38 to avoid making contact with other accessories attached to the lower part of the stack frame 2.

The first bracket 4 made of metal such as iron or aluminum is a member via which the fuel gas pump 38 is fixedly attached to the stack frame 2 and includes a flat-shaped attachment portion 4a extending horizontally. The attachment portion 4a is a flat-shaped part via which the first bracket 4 is attached to the stack frame 2, and the first bracket 4 is attached to the stack frame 2 by first and second fastening members 5a, 5b such as two bolts in the attachment portion 4a.

Further, the first bracket 4 includes clamping portions 4b extending downward from the opposite sides of the attachment portion 4a so as to sandwich the fuel gas pump 38.

Further, the first bracket 4 further includes attachment portions 4c extending outward from the clamping portions 4b. The attachment portion 4c is a part via which the first bracket 4 is attached to the fuel gas pump 38. Thus, the first bracket 4 is a member formed generally in a saddle shape and placed in the fuel gas pump 38. Further, three welding nuts 4d in total for fixing the fuel gas pump 38 to the first bracket 4 are provided such that one of the three welding nuts 4d is fixed to one of the attachment portions 4c and the other two of the three welding nuts 4d are fixed to the other one of the attachment portions 4c.

The attachment portion 4a of the first bracket 4 has a through-hole 4e via which the first bracket 4 is fixed to (supported by) the stack frame 2. The first fastening member 5a is fixed to the stack frame 2 and the first bracket 4 in a state where the first fastening member 5a is passed through the through-hole 4e.

In the present embodiment, the first fastening member 5a is passed through the through-hole 4e, and the first fastening member 5a is screwed into an internal-thread hole opened on a bottom face of the stack frame 2, so that the first bracket 4 is sandwiched between the head of the first fastening member 5a and the stack frame 2. Hereby, the first bracket 4 is fixed to the lower part of the stack frame 2. Due to the through-hole 4e, the fuel gas pump 38 is fixed (supported) in a horizontally rotatable manner around the first fastening member 5a passed through the through-hole 4e of the first bracket 4.

Further, a first notch 6 is formed in an edge of the attachment portion 4a of the first bracket 4. The second fastening member 5b fixes the stack frame 2 and the first bracket 4 in a state where the second fastening member 5b is passed through the first notch 6. The first notch 6 has a recessed portion 6a through which a shank of the second fastening member 5b passes, and an opening 6b that is opened from the recessed portion 6a. The first notch 6 is formed to expand toward the opening 6b from the recessed portion 6a (for example, see FIG. 6B).

In the present embodiment, the second fastening member 5b is passed through the first notch 6, and the second fastening member 5b is screwed into an internal-thread hole opened on the bottom face of the stack frame 2, so that the first bracket 4 is sandwiched between the head of the second fastening member 5b and the stack frame 2. Hereby, the first bracket 4 is fixed to the lower part of the stack frame 2. Thus, the second fastening member 5b engages with the first notch 6.

The first notch 6 is formed such that, when the first bracket 4 rotates together with the fuel gas pump 38 relative to the stack frame 2 around the first fastening member 5a passed through the through-hole 4e as a rotation center, the second fastening member 5b comes off from the first bracket 4 and slips out of the opening 6b of the first notch 6. As a result, as will be described later, when the first bracket 4 rotates around the first fastening member 5a as the rotation center at the time of a front end collision of the fuel cell vehicle 1, the second fastening member 5b is disengaged from the first notch 6, so that the second fastening member 5b can be smoothly removed from the first notch 6.

Figure 6A:
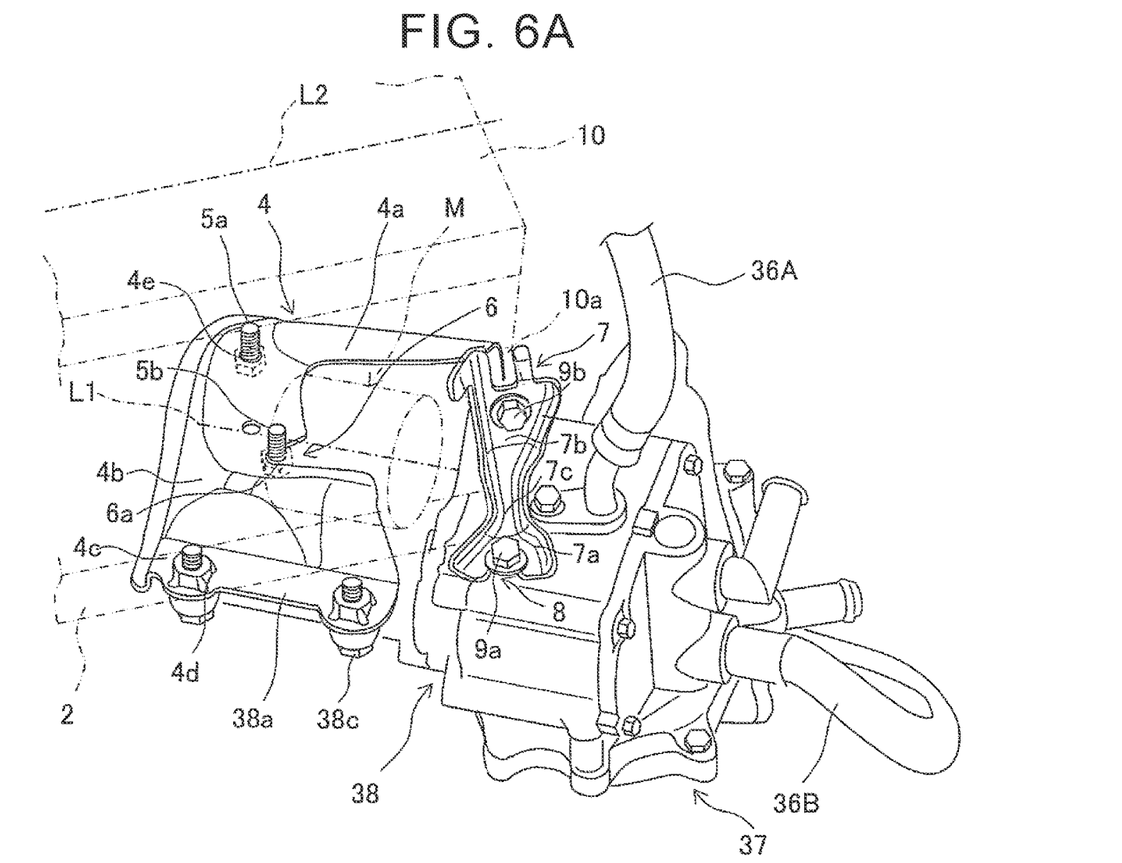
FIG. 6A is a main perspective view of a fuel gas pump and a gas-liquid separator illustrated in FIGS. 3 to 5.
Figure 6B:
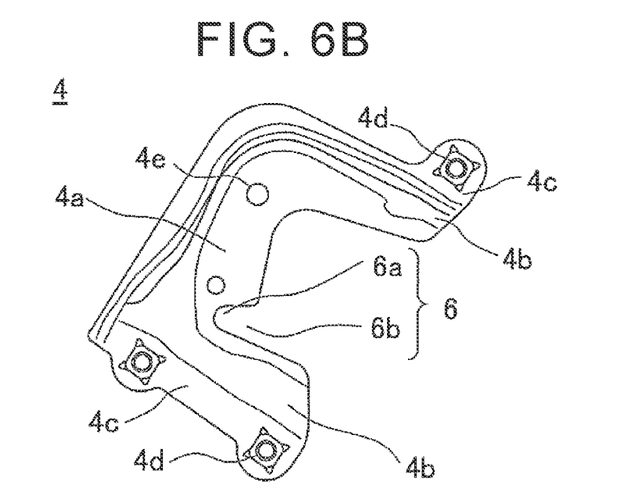
FIG. 6B is a plan view of a first bracket.

Further, as illustrated in FIGS. 5, 6A and so on, the fuel gas pump 38 includes rib-shaped portions 38a projecting from the opposite side surfaces of the fuel gas pump 38 and extending horizontally, and three through-holes 38b are formed in the rib-shaped portions 38a so as to correspond to three weld nuts 4d fixed to the attachment portions 4c of the first bracket 4. Bolts 38c and the like are passed through the three through-holes 38b, so that the fuel gas pump 38 can be attached to the first bracket 4 fixed on the lower side of the stack frame 2 by the first and second fastening members 5a, 5b.

Figure 6C:
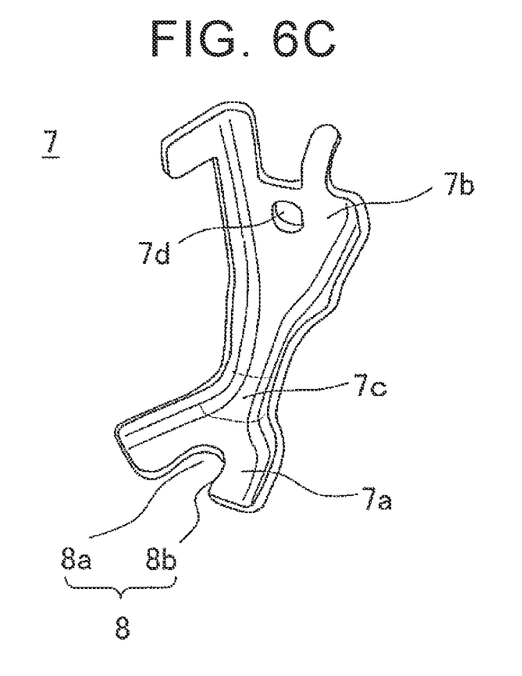
FIG. 6C is a perspective view of a second bracket.

Further, as illustrated in FIGS. 6A and 6C, an upper part of the fuel gas pump 38 is attached to the fuel cell stack 10 via the second bracket 7. Hereby, the fuel gas pump 38 is attached to the fuel cell stack 10 and the stack frame 2 via two brackets, i.e., the first bracket 4 and the second bracket 7, so that an attachment state of the fuel gas pump 38 is stabilized.

The second bracket 7 is, for example, a member formed by pressing a plate material made of a plastically deformable metallic material such as steel or aluminum alloy. As illustrated in FIG. 6C, the second bracket 7 includes a first arm 7a extending horizontally and a second arm 7b extending vertically, so that the second bracket 7 is formed as an L-shaped bracket in which the first arm 7a and the second arm 7b are connected via a bending portion 7c. For example, the second bracket 7 is configured to easily plastically deform near the bending portion 7c when a load is applied to one of the arms in a state where the other one of the arms is fixed. The first arm 7a and the second arm 7b may extend horizontally and vertically, respectively. The first arm 7a and the second arm 7b may extend in the different directions each other.

A second notch 8 is formed in the horizontal first arm 7a of the second bracket 7. The second notch 8 has a recessed portion 8a to which a shank of a third fastening member 9a fits, and an opening 8b that is opened from the recessed portion 8a. The first arm 7a is attached to the fuel gas pump 38 by the third fastening member 9a passed through the second notch 8. The second notch 8 is formed such that, when the first bracket 4 rotates around the first fastening member 5a passed through the through-hole 4e of the first bracket 4 as a rotation center, the third fastening member 9a comes off from the second bracket 7 and slips out of the second notch 8. A through-hole 7d is formed in the second arm 7b of the second bracket 7, and a fourth fastening member 9b is passed through the through-hole 7d, so that the second arm 7b is fixed to the fuel cell stack 10.

As such, the first arm 7a is placed on the top face of the fuel gas pump 38 and is fixed to the fuel gas pump 38 by fastening the third fastening member 9a such as a bolt to the fuel gas pump 38. In the meantime, the second arm 7b extends toward the fuel cell stack 10 side from the top face of the fuel gas pump 38 and is fixed to the fuel cell stack 10 by fastening the fourth fastening member 9b to an internal-thread hole 10a (see FIG. 5) formed on a side face of the fuel cell stack 10. Thus, the upper part of the fuel gas pump 38 can be fixed stably to the stack frame 2. Note that, in the present embodiment, the second arm 7b is fixed to the fuel cell stack 10 by the fourth fastening member 9b, but the second arm 7b may be welded to the fuel cell stack 10, for example.

In the present embodiment, the first and second brackets 4, 7 are formed such that, when the fuel gas pump 38 rotates relative to the stack frame 2, the third fastening member 9a comes off from the second bracket 7 and slips out of the second notch 8 at a timing different from a timing when the second fastening member 5b comes off from the first bracket 4. For example, when a contact length by which the second fastening member 5b makes contact with the first bracket 4 and a contact length by which the third fastening member 9a makes contact with the second bracket 7 are adjusted during a rotation operation of the fuel gas pump 38, the timings when the second fastening member 5b and the third fastening member 9a come off from their corresponding brackets can be made different from each other. However, the present embodiment employs the following configuration.

More specifically, the second bracket 7 is a plastically deformable metal member, and the second bracket 7 is formed such that, when the fuel gas pump 38 rotates relative to the stack frame 2, at least the bending portion 7c of the second bracket 7 deforms plastically, and after the plastic deformation of the bending portion 7c, the third fastening member 9a comes off from the second bracket 7.

Hereby, in the first bracket 4, when the fuel gas pump 38 rotates relative to the stack frame 2, the bending portion 7c deforms plastically because the second bracket 7 is restricted by the third and fourth fastening members 9a, 9b. Due to the plastic deformation, an impact load caused at the time of a collision of the vehicle can be absorbed by the second bracket 7. Further, while the second bracket 7 deforms plastically, the second fastening member 5b can come off from the first bracket 4, and after that, the third fastening member 9a can come off from the second bracket 7. Thus, the timings when the second fastening member 5b and the third fastening member 9a come off from respective brackets can be made different from each other.

Further, the second bracket 7 has a shape narrowed at the bending portion 7c that connects the first arm 7a to the second arm 7b. That is, the widths of the first and second arms 7a, 7b having a plate shape decrease toward the bending portion 7c.

As such, the bending portion 7c of the second bracket 7 is a more vulnerable part than other parts, so that the second bracket 7 can easily deform plastically at the bending portion 7c. Hereby, while an impact load is absorbed by the bending portion 7c, it is possible to restrain disturbance to the rotation of the fuel gas pump 38.

Figure 11:
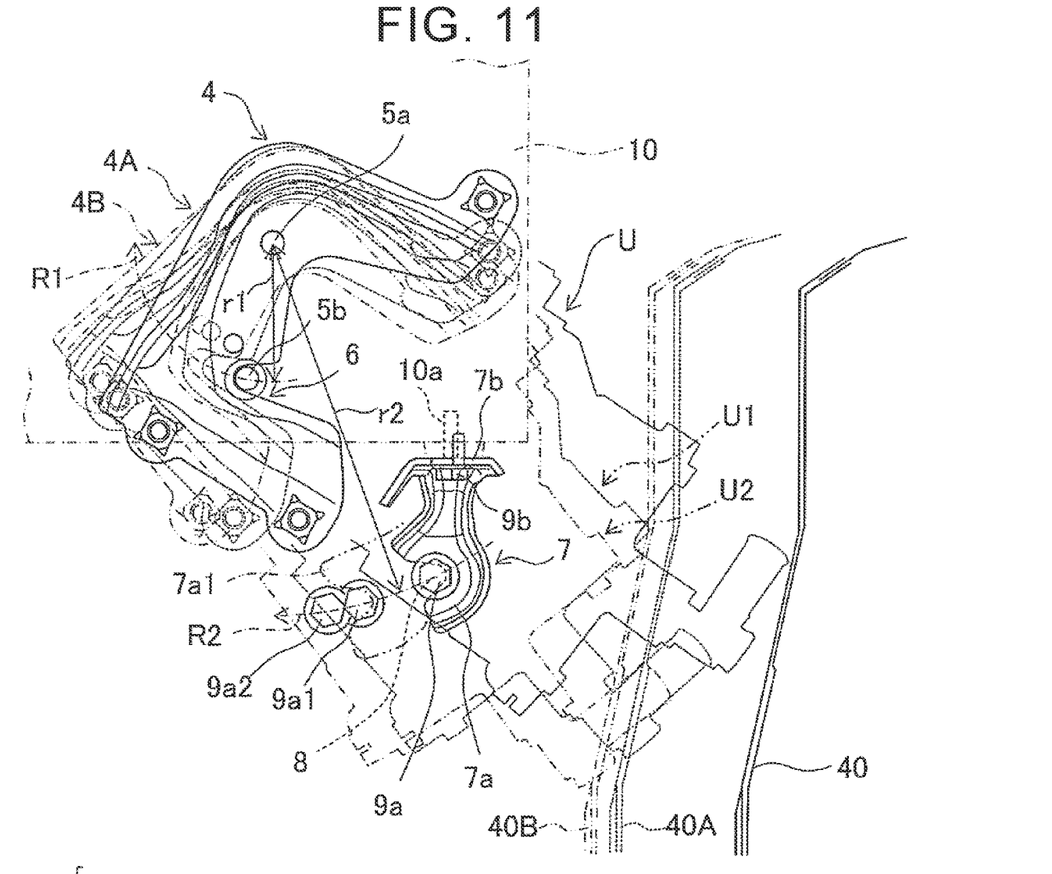
FIG. 11 is a schematic plan view illustrating a rotating operation of the fuel gas pump at the time of a collision.

Further, in the present embodiment, a distance r2 from a rotation center where the first fastening member 5a is placed to an attachment position of the third fastening member 9a is longer than a distance r1 from the rotation center to an attachment position of the second fastening member 5b (see FIG. 11 and so on).

When the fuel gas pump 38 rotates relative to the stack frame 2, a larger moment is applied to the third fastening member 9a than a moment applied to the second fastening member 5b, so that the second bracket 7 easily deforms plastically. Hereby, while an impact load is absorbed by the bending portion 7c, it is possible to restrain disturbance to the rotation of the fuel gas pump 38.

Further, in FIG. 6A, in the present embodiment, pipes 36A, 36B constituting the circulation passage 36 connected to the fuel gas pump 38 are pipes made of rubber or resin and having a flexibility. The pipe 36A is a pump-discharge-side pipe connected to the fuel cell stack 10, and the pipe 36B is a pump-intake-side pipe connected to the gas-liquid separator 37. Since the pipes 36A, 36B are pipes having a flexibility, even if the fuel gas pump 38 rotates at the time of a collision of the fuel cell vehicle 1, it is possible to restrain disturbance to the rotation of the fuel gas pump 38 and also to restrain damage to the pipes.

In the present embodiment, the gas-liquid separator 37 is made of resin and is attached by screwing fastening members 37a (see FIG. 5) such as bolts into two internal-thread holes formed on a bottom face of the fuel gas pump 38. The gas-liquid separator 37 has a function to separate liquid and gas from each other in the fuel offgas discharged from the fuel cell stack 10. A liquid content separated herein is mixed with the oxidant offgas discharged from the fuel cell stack 10 and then discharged outside the fuel cell vehicle 1.

Figure 8:
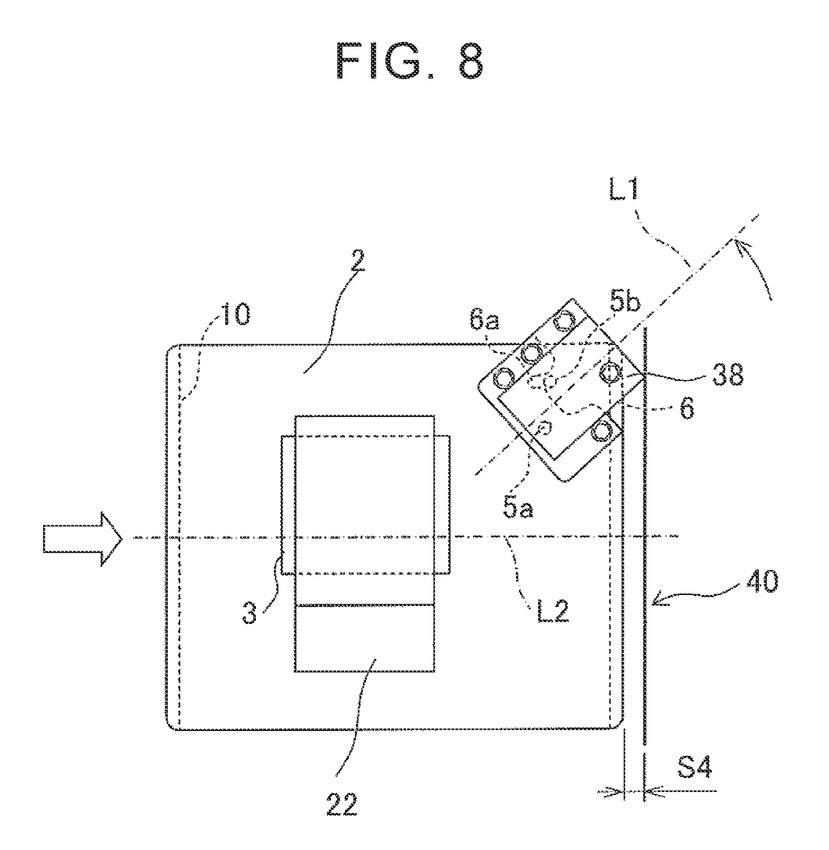
FIG. 8 is a main schematic view of the bottom side and illustrates an operation at the time of a collision with a large impact.
Figure 9:
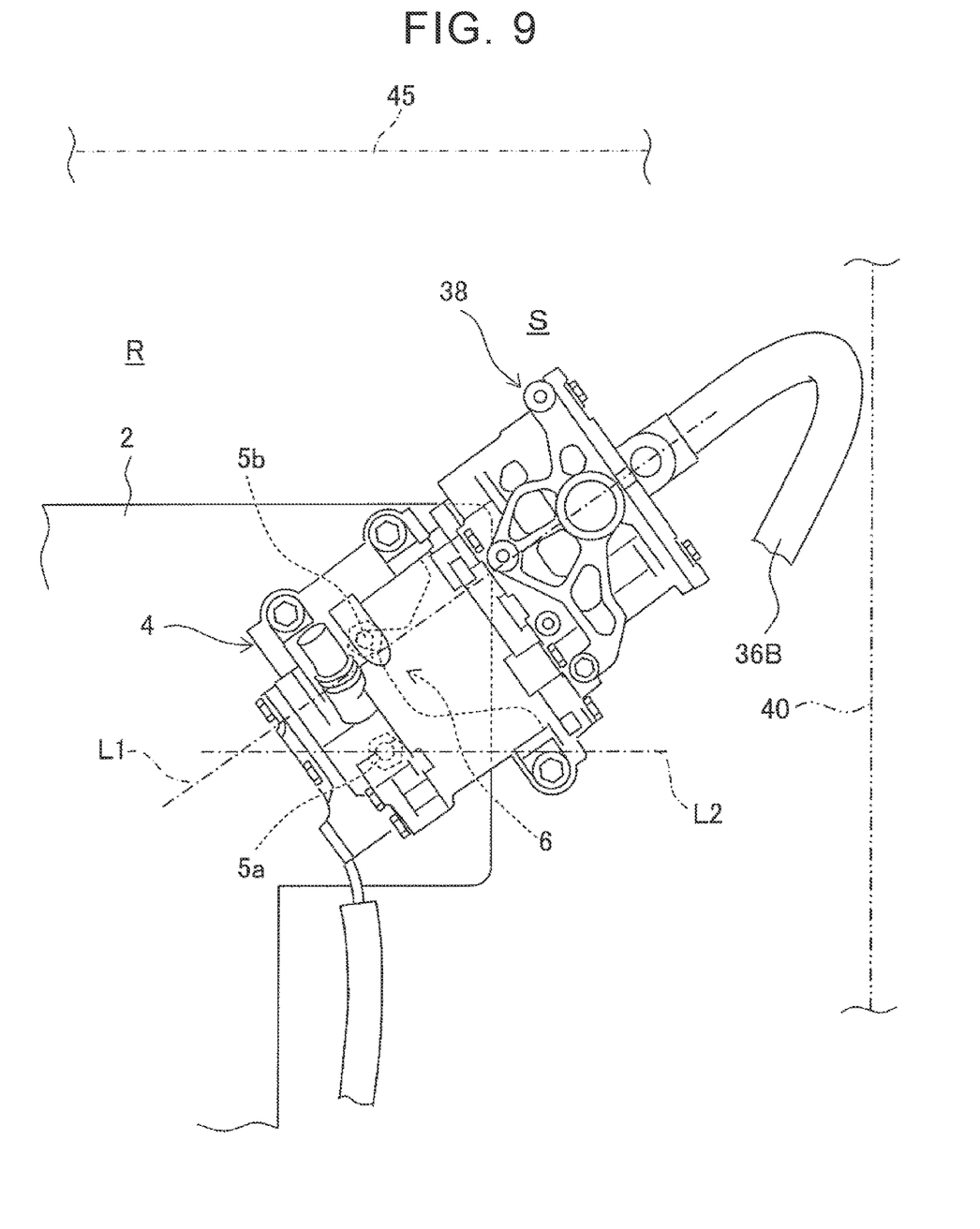
FIG. 9 is a bottom view illustrating an arrangement position in a normal time of the fuel gas pump.
Figure 10:
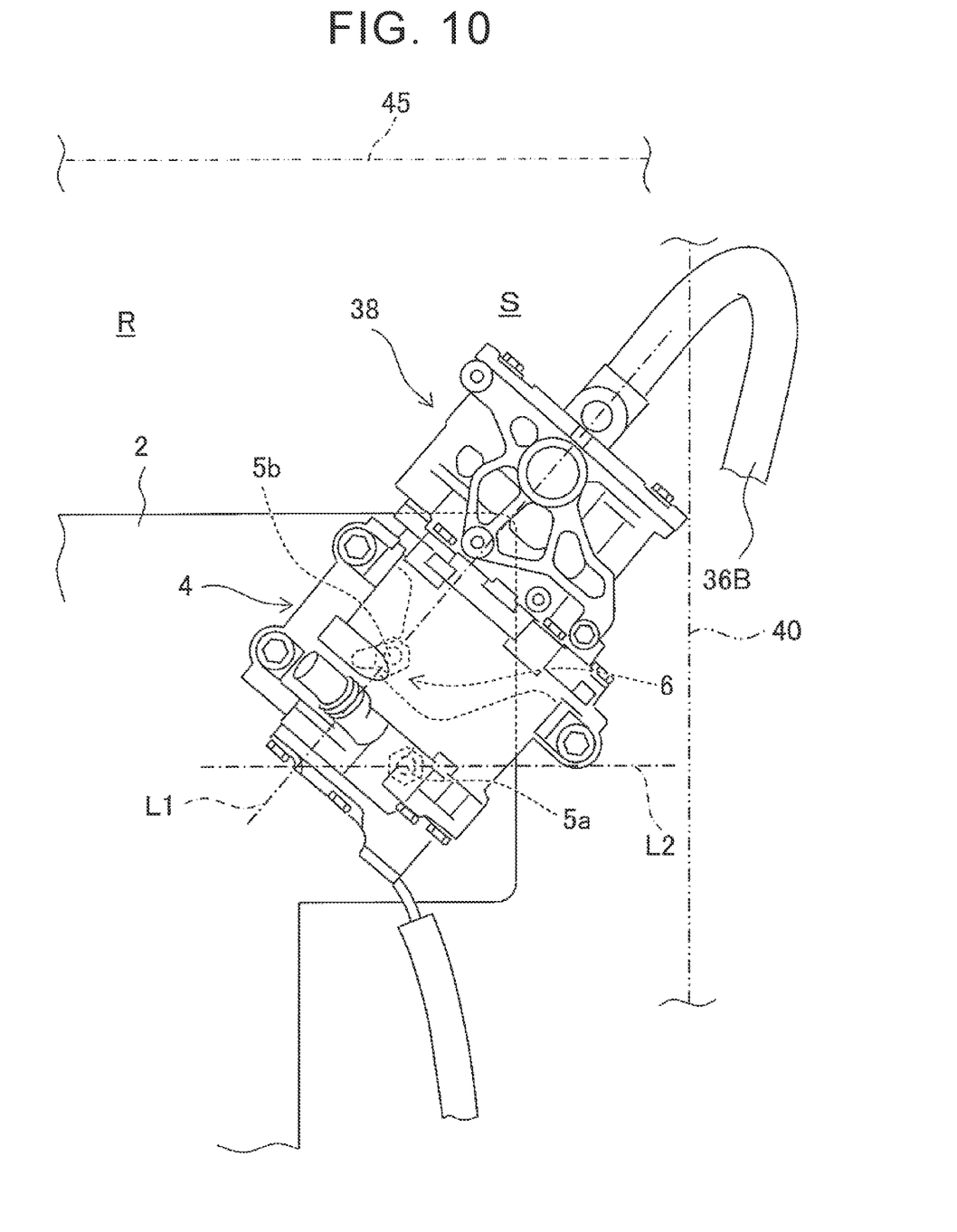
FIG. 10 is a bottom view illustrating an arrangement position when the fuel gas pump rotates at the time of a collision.

An operation of the fuel cell vehicle 1 of the present embodiment configured as described above will be described below with reference to FIGS. 7 to 10. Note that FIGS. 7, 8 are schematic views illustrating the fuel gas pump 38 in a simplified manner, and FIGS. 9, 10 are bottom views illustrating the fuel gas pump 38 in detail.

When the fuel cell vehicle 1 collides with an obstacle or the like, for example, the front room R of the vehicle is crushed to deform, and the fuel cell stack 10 and an accessory unit associated with this are moved rearward by the obstacle. More specifically, due to a movement of the stack frame 2, the fuel cell stack 10, the compressor 22, the fuel gas pump 38, and the gas-liquid separator 37 attached to the stack frame 2 move rearward and approach the dash panel 40.

Figure 7:
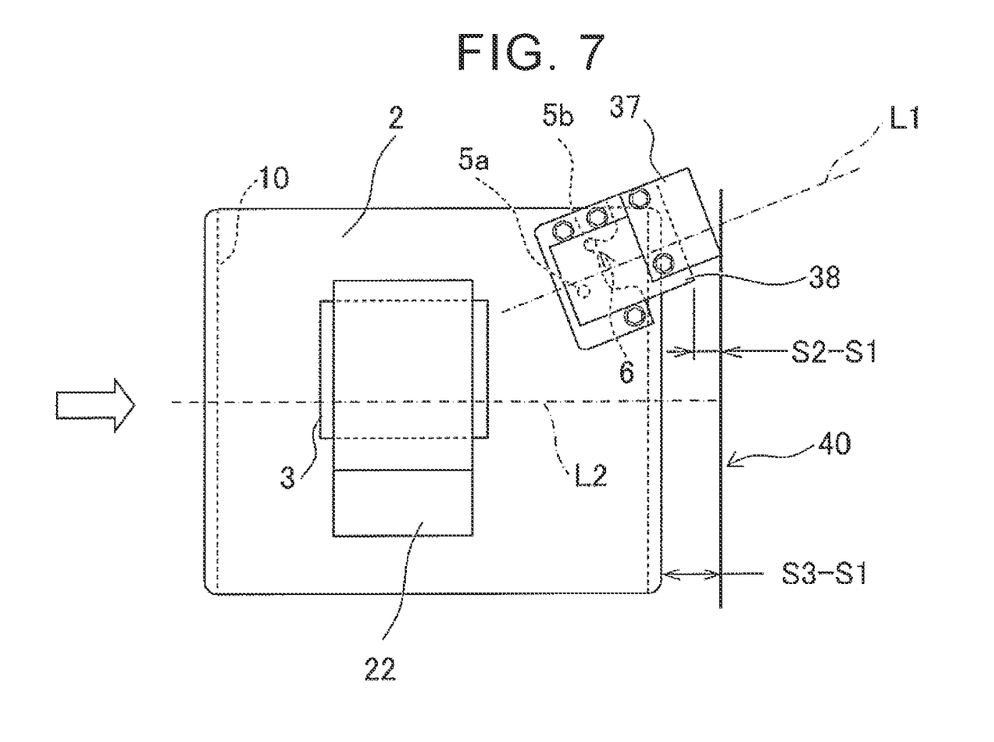
FIG. 7 is a main schematic view of a bottom side and illustrates an operation at the time of a collision with a small impact.

In a case where an impact of the collision is small, the fuel cell stack 10 and the accessory unit just approach the dash panel 40, as illustrated in FIG. 7. When the gas-liquid separator 37 abuts with the dash panel 40, for example, a distance between the fuel gas pump 38 and the dash panel 40 changes from the distance illustrated in FIG. 3 to (S2−S1), and a distance between the stack frame 2 and the dash panel 40 changes from the distance illustrated in FIG. 3 to (S3−S1).

In a case where the impact of the collision is large, the gas-liquid separator 37 placed on the rearmost side collides with the metal dash panel 40, so that the gas-liquid separator 37 is broken. Since the gas-liquid separator 37 is made of resin, the gas-liquid separator 37 is easily broken to absorb the impact. In a case where the impact is further large, the fuel gas pump 38 collides with the dash panel 40. Note that, in a case where the gas-liquid separator 37 does not project toward the dash panel 40 side from the fuel gas pump 38 or in a case where the gas-liquid separator 37 is not provided, the fuel gas pump 38 collides with the dash panel 40 as described below.

When the fuel gas pump 38 collides with the dash panel 40, the rear corner part of the fuel gas pump 38 abuts with the dash panel 40, so that a reaction force is generated at the rear corner part, as illustrated in FIG. 8. Here, as described above, the fuel gas pump 38 is fixed to the stack frame via the first bracket 4 so that the rotation axis L1 of the motor M that drives the fuel gas pump 38 is inclined to the reference line L2 along the front-rear direction of the fuel cell vehicle 1, in a plan view of the fuel cell vehicle 1, and the fuel gas pump 38 is fixed to the fuel cell stack 10 via the second bracket 7. Hereby, when the fuel gas pump 38 makes contact with the dash panel 40, a moment is applied to the fuel gas pump 38, so that the fuel gas pump 38 is to rotate in a direction where the fuel gas pump 38 is separated from the dash panel, as illustrated in FIG. 8.

Figure 12:
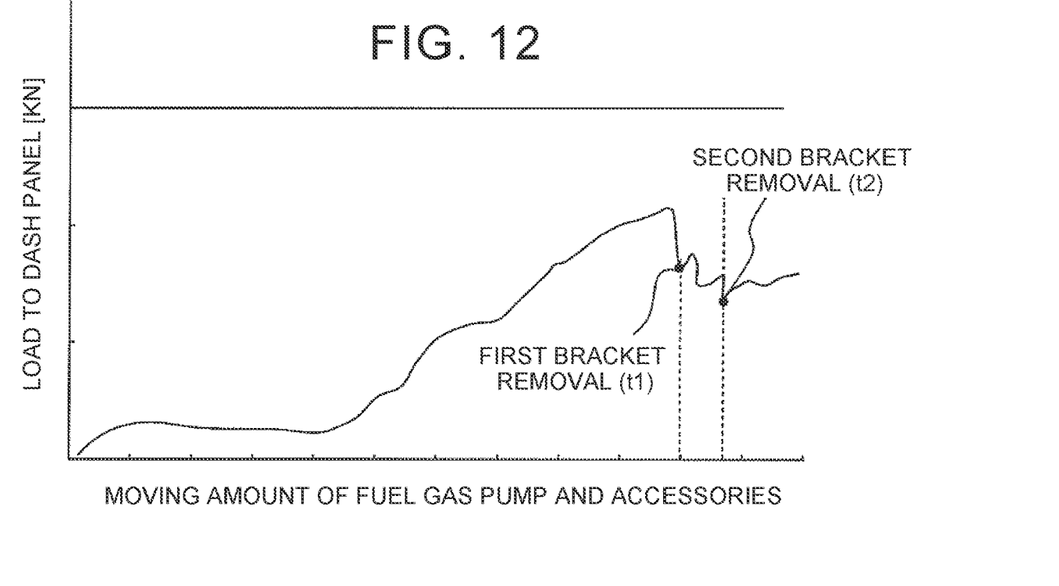
FIG. 12 is a graph illustrating a relationship between a load to be applied to a dash panel and a moving amount of the fuel gas pump and an accessory unit at the time of a collision of the fuel gas pump.

At this time, as illustrated in FIGS. 8 and 10, the first bracket 4 rotates together with the fuel gas pump 38 in a counterclockwise direction (a direction directed outward the vehicle) relative to the stack frame 2 around the first fastening member 5a passed through the through-hole of the first bracket 4, so that the second fastening member 5b comes off from the first bracket 4 and slips out of the opening 6b of the first notch 6 (FIG. 12, a first removal timing t1).

When the fuel gas pump 38 rotates in the counterclockwise direction, the fuel gas pump 38 does not push the dash panel 40, thereby making it possible for the fuel gas pump 38 to avoid pushing the dash panel 40. Hereby, it is possible to avoid damage to the fuel gas pump 38 and the dash panel 40. Note that, due to the rotation of the fuel gas pump 38, the second bracket 7 deforms plastically at the bending portion 7c so that the curvature of the bending portion 7c increases, thereby absorbing the impact. Due to the rotation of the fuel gas pump 38, the distance between the stack frame 2 and the dash panel 40 becomes S4 (see FIG. 8).

When the impact further continues after the second fastening member 5b has slipped out of the first notch 6 of the first bracket 4 and the bending portion 7c of the second bracket 7 has deformed plastically, the third fastening member 9a that fixes the second notch 8 formed in the first arm 7a of the second bracket 7 comes off from the second bracket 7 and slips out of the second notch 8 (FIG. 12, a second removal timing t2). Hereby, the first arm 7a of the second bracket 7 becomes free, thereby making it possible to restrain a load to be applied to the dash panel 40 and to restrain deformation of the dash panel 40.

Next will be more specifically described the behavior of each member at the first and second removal timings t1, t2 with reference to FIG. 11. FIG. 11 is a schematic plan view illustrating a positional relationship among the fuel cell stack 10, the first bracket 4, the second bracket 7, an accessory unit U in which the fuel gas pump 38 is integrated with the gas-liquid separator 37, and the dash panel 40. Note that, in FIG. 11, the fuel cell stack 10 and the accessory unit U move rearward in the vehicle front-rear direction and rotate at the time of a collision. However, this figure is illustrated such that the fuel cell stack 10 and the accessory unit U just rotate and the dash panel 40 moves forward relative to them.

In FIG. 11, the first notch 6 of the first bracket 4 is opened on a circular arc R1 with a first distance r1 to the first fastening member 5a as the rotation center for the first bracket 4 to rotate. The second notch 8 of the second bracket 7 is opened on a circular arc R2 with a second distance r2 to the first fastening member 5a as the rotation center for the first bracket 4 to rotate.

The first bracket 4 to which the fuel gas pump 38 is attached indicates a normal state at a position drawn by a continuous line. A first bracket 4A indicated by a dotted line indicates a state where an impact is applied due to a collision or the like so that the fuel gas pump 38 and the accessory unit U rotate, and the second fastening member 5b comes off from the first bracket 4 and slips out of the first notch 6 at the first removal timing t1. Further, a first bracket 4B indicated by an alternate long and two short dashes line indicates a state where a large impact is applied due to a collision or the like so that the fuel gas pump 38 and the accessory unit U further rotate, and the third fastening member 9a comes off from the second bracket 7 and slips out of the second notch 8 at the second removal timing t2.

The second bracket 7 is fixed such that the fourth fastening member 9b is passed through the through-hole 7d and screwed into the internal-thread hole 10a of the fuel cell stack 10. When an impact is applied due to a collision or the like, the fuel gas pump 38 and the accessory unit U rotate, and when the first removal timing t1 comes, the third fastening member 9a rotates to a position 9a1. However, the first arm 7a of the second bracket deforms plastically at the bending portion 7c and deforms to extend to a position 7a1. Accordingly, at this stage, the third fastening member 9a does not slip out of the second notch 8 of the second bracket 7. When the impact is large and the rotation further advances, the third fastening member 9a rotates to a position 9a2, and the third fastening member 9a comes off from the second bracket 7 and slips out of the second notch 8.

Here, a load to be applied to the dash panel illustrated in FIG. 12 will be described. In FIG. 12, the horizontal axis indicates a moving amount of the fuel pump and the accessory unit, and the vertical axis indicates a load to be applied to the dash panel. In FIG. 12, when the fuel cell stack 10 and the accessory unit associated with this are moved rearward in the vehicle front-rear direction due to an impact of a collision or the like, the fuel cell stack 10 and the accessory unit approach the dash panel 40. Then, as the moving amount increases, the load to be applied to the dash panel gradually increases. When the load exceeds a predetermined value, the second fastening member 5b fixing the first bracket 4 slips out of the first notch 6, so that the load decreases. After that, when the moving amount further increases, the load increases, so that the bending portion 7c deforms. When the moving amount further increases, the third fastening member 9a fixing the first arm 7a of the second bracket 7 slips out of the second notch 8, so that the load decreases.

As such, the load to be applied to the dash panel 40 can be reduced at the first removal timing t1 at which the second fastening member 5b slips out of the first notch 6 of the first bracket 4, and the load to be applied to the dash panel 40 can be further reduced at the second removal timing t2 at which the third fastening member 9a slips out of the second notch 8 of the second bracket 7. This makes it possible to restrain the deformation of the dash panel 40 and to restrain the fuel cell stack 10 and the accessory unit from projecting into the cabin C, thereby making it possible to further increase safety of an occupant.

Particularly, in the present embodiment, the fuel gas pump 38 is attached to the stack frame 2 on a side closer to a front fender 45, and the rotation axis L1 of the motor M is inclined so as to approach the center line along the front-rear direction of the fuel cell vehicle 1 as it goes forward in the vehicle front-rear direction. As a result, the fuel gas pump 38 rotates in the space S on the front fender 45 side in the front room R, thereby making it possible for the fuel gas pump 38 to avoid making contact with other accessories attached to the lower part of the stack frame 2 (see FIGS. 9 and 10).

One embodiment has been described above, but the disclosure is not limited to the above embodiment, and various modifications in design are performable. For example, the above embodiment deals with an example in which the rotation axis of a drive shaft of the motor that drives the pump is employed as a reference line of the fuel gas pump. However, the disclosure is not limited to this, and a center line, in the longitudinal direction, that passes through the gravitational center of the fuel gas pump may be used.

Further, the above embodiment deals with an example in which a fastening bolt is employed as the rotation center around which the fuel gas pump rotates to escape from the dash panel at the time of a collision. However, the fuel gas pump may be configured to rotate by use of a shaft material such as a pin.

In the present embodiment, the gas-liquid separator projects toward the dash panel side from the fuel gas pump. However, the gas-liquid separator may not project toward the dash panel side from the fuel gas pump, or the gas-liquid separator may be omitted as needed.

In the present embodiment, the fuel cell stack is put on the stack frame and the fuel gas pump is attached to a lower side of the stack frame. However, the stack frame may be configured such that the fuel gas pump is attached to an upper side of the stack frame above the fuel cell stack, and the first bracket and the second bracket may be configured such that the fuel gas pump is rotated above the fuel cell stack.

What is claimed is:

1. A fuel cell vehicle comprising:
a fuel cell stack;
a fuel gas pump configured to circulate, to the fuel cell stack, part of fuel offgas discharged from the fuel cell stack;
a front room in which the fuel cell stack and the fuel gas pump are stored, the front room being provided on a front side of the fuel cell vehicle in a vehicle front-rear direction; and
a dash panel separating the front room from a cabin,
wherein:
the fuel cell stack is put on a stack frame fixed to the front room;
the fuel gas pump is attached to a lower side of the stack frame in a state where the fuel gas pump projects toward a dash panel side from the stack frame;
the fuel gas pump is fixed to the stack frame and the fuel cell stack via a first bracket and a second bracket such that a rotation axis of a motor configured to drive the fuel gas pump is inclined to a reference line along the vehicle front-rear direction in a plan view of the fuel cell vehicle;
the first bracket includes a flat-shaped attachment portion which has a through-hole and a first notch;
the attachment portion is attached to the stack frame by a first fastening member and a second fastening member;
the first fastening member fixes the stack frame to the first bracket in a state where the first fastening member is passed through the through-hole;
the second fastening member fixes the stack frame to the first bracket in a state where the second fastening member is passed through the first notch;
the second bracket includes a first arm extending in a first direction and a second arm connected to the first arm via a bending portion and extending in a second direction, the second direction being a direction different from the first direction;
the first arm has a second notch;
the first arm is attached to the fuel gas pump by a third fastening member passed through the second notch;
the second arm is fixed to the fuel cell stack; the first notch is provided such that the second fastening member comes off from the first bracket and slips out of the first notch when the fuel gas pump rotate, relative to the stack frame, around the first fastening member as a rotation center;
the second notch is provided such that the third fastening member comes off from the second bracket and slips out of the second notch; and
the first bracket and the second bracket are configured such that the third fastening member comes off from the second bracket and slips out of the second notch by rotating the fuel gas pump at a timing different from a timing when the second fastening member comes off from the first bracket.

2. The fuel cell vehicle according to claim 1, wherein:
the second bracket is a plastically deformable metal member; and
the second bracket is configured such that, when the fuel gas pump rotates relative to the stack frame, the third fastening member comes off from the second bracket after at least the bending portion of the second bracket deforms plastically.

3. The fuel cell vehicle according to claim 2, wherein the second bracket has a shape narrowed at the bending portion.

4. The fuel cell vehicle according to claim 1, wherein a distance from the rotation center to an attachment position of the third fastening member is longer than a distance from the rotation center to an attachment position of the second fastening member.

5. The fuel cell vehicle according to claim 1, wherein:
the second arm extends along a side face of the fuel cell stack in a vehicle width direction; and
the bending portion is connected to a bottom end of the second arm.

6. The fuel cell vehicle according to claim 5, wherein:
the first notch is provided on a rear side of the attachment portion in the vehicle front-rear direction; and
the second notch is provided on a front side of the first arm in the vehicle front-rear direction.

7. The fuel cell vehicle according to claim 1, wherein an attachment position of the third fastening member is behind a straight line connecting the rotation center and an attachment position of the second fastening member in the vehicle front-rear direction.

8. The fuel cell vehicle according to claim 1, wherein:
the first direction is a horizontal direction; and
the second direction is a vertical direction.

9. A fuel cell vehicle comprising:
a fuel cell stack;
a fuel gas pump configured to circulate, to the fuel cell stack, part of fuel offgas discharged from the fuel cell stack;
a front room in which the fuel cell stack and the fuel gas pump are stored, the front room being provided on a front side of the fuel cell vehicle in a vehicle front-rear direction; and
a dash panel separating the front room from a cabin,
wherein:
the fuel cell stack is put on a stack frame fixed to the front room;
the fuel gas pump is attached to the stack frame in a state where the fuel gas pump projects toward a dash panel side from the stack frame;
the fuel gas pump is fixed to the stack frame and the fuel cell stack via a first bracket and a second bracket such that a line align a longitudinal direction of the fuel gas pump is inclined to a reference line along the vehicle front-rear direction in a plan view of the fuel cell vehicle;
the first bracket includes a flat-shaped attachment portion which has a through-hole and a first notch;
the attachment portion is attached to the stack frame by a first fastening member and a second fastening member;
the first fastening member fixes the stack frame to the first bracket in a state where the first fastening member is passed through the through-hole;
the second fastening member fixes the stack frame to the first bracket in a state where the second fastening member is passed through the first notch;
the second bracket includes a first arm extending in a first direction and a second arm connected to the first arm via a bending portion and extending in a second direction, the second direction being a direction different from the first direction;
the first arm has a second notch;
the first arm is attached to the fuel gas pump by a third fastening member passed through the second notch;
the second arm is fixed to the fuel cell stack; and
the first bracket and the second bracket are provided such that the second fastening member and the third fastening member come off from the first bracket and the second bracket respectively at different timings in a case where the fuel gas pump rotates around the first fastening member as a rotation center.

\* \* \* \* \*